US008026914B2

(12) United States Patent
Imai

(10) Patent No.: US 8,026,914 B2
(45) Date of Patent: Sep. 27, 2011

(54) NUMERICAL ANALYSIS MESH GENERATION APPARATUS, NUMERICAL ANALYSIS MESH GENERATION METHOD, AND NUMERICAL ANALYSIS GENERATION PROGRAM

(75) Inventor: Kanako Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 11/433,389

(22) Filed: May 15, 2006

(65) Prior Publication Data

US 2007/0182735 A1    Aug. 9, 2007

(30) Foreign Application Priority Data

Feb. 8, 2006    (JP) .................................. 2006-031424

(51) Int. Cl.
    *G06T 17/00*    (2006.01)
(52) U.S. Cl. ........................................ 345/420
(58) Field of Classification Search .................. None
    See application file for complete search history.

(56) References Cited

U.S. PATENT DOCUMENTS

| 5,315,537 | A  |   | 5/1994  | Blacker ....................... 364/570 |
| 5,619,625 | A  | * | 4/1997  | Konno et al. ................. 345/419 |
| 5,655,063 | A  | * | 8/1997  | Crocker ....................... 345/420 |
| 5,694,536 | A  | * | 12/1997 | Gangnet et al. ............... 345/442 |
| 6,771,261 | B2 | * | 8/2004  | MacPherson .................. 345/420 |
| 6,806,874 | B2 | * | 10/2004 | Biermann et al. ............. 345/420 |

(Continued)

FOREIGN PATENT DOCUMENTS

JP    8-44906    2/1996

(Continued)

OTHER PUBLICATIONS

Lindstrom, P. et al. "Level-of-Detail Management for Real-Time Rendering of Phototextured Terrain," GVU Technical Report GIT-GVU-95-06 [online], [retrieved on Jun. 19, 2010]. Retrieved from the Internet <URL:http://smartech.gatech.edu/bitstream/1853/3551/1/95-06.pdf>.*
Cignoni, P. et al., A Comparison of Mesh Simplification Algorithms, Comput. & Graphics, vol. 22, No. 1, pp. 37-54, Feb. 25, 1998 (18 pages).

(Continued)

*Primary Examiner* — Ulka Chauhan
*Assistant Examiner* — Robert Bader
(74) *Attorney, Agent, or Firm* — Staas & Halsey LLP

(57) ABSTRACT

The present invention has been made to provide a technique capable of contributing to a reduction in operational burden on workers and an increase in operating accuracy in a generation process of a mesh for numerical analysis for a geometric model.
A numerical analysis mesh generation apparatus generates a mesh for use in performing numerical analysis for a geometric model to be analyzed. The apparatus comprises: a reference surface selection section that selects one surface from a plurality of surfaces constituting the geometric model as a reference surface; an edge projection section that projects, in a predetermined direction, edges of the geometric model located in a predetermined direction away from the reference surface selected by the reference surface selection section on the reference surface; an interval determination section that determines an interval between edges projected on the reference surface by the edge projection section; a grouping section that groups two or more edges with one of the two or more edges set as a representative edge when the interval determination section determines that the interval between them is smaller than a predetermined interval; and a mesh generation section that generates a mesh for the reference surface based on a surface divided using the edges grouped by the grouping section.

15 Claims, 16 Drawing Sheets

DELETION OF CURVE

U.S. PATENT DOCUMENTS

| | | | |
|---|---|---|---|
| 6,812,924 B2 * | 11/2004 | Kondo | 345/420 |
| 7,139,977 B1 * | 11/2006 | Russell | 715/234 |
| 2008/0165127 A1 * | 7/2008 | Eom | 345/161 |

FOREIGN PATENT DOCUMENTS

| | | |
|---|---|---|
| JP | 11-144093 | 5/1999 |
| JP | 2001-155187 | 6/2001 |
| JP | 2003-281201 | 10/2003 |
| JP | 2004-62637 | 2/2004 |

OTHER PUBLICATIONS

Heckbert, P. et al., Survey of Polygonal Surface Simplification Algorithms, Computer Graphics Proceedings, Siggraph 97, pp. 1-29, May 1, 1997 (29 pages).

European Search Report dated Mar. 20, 2008 in corresponding European Patent Application No. 06114686.6 (5 pages).

Japanese Office Action issued Apr. 5, 2011 in corresponding Japanese Patent Application 2006-031424.

* cited by examiner

MESH CREATION TARGET GEOMETRIC MODEL

FIG. 4

|   | 1 | 2 | 3 | | 1500 |
|---|---|---|---|---|---|
| 1 | SURFACE NUMBER | EDGE NUMBER | EDGE NUMBER | ~ | EDGE NUMBER |
| ⑤ | | | | | |
| 100 | | | | | |

DEFINITION OF SEQUENCE SURF

FIG. 5

|   | 1 | 2 | 3 | | 100 |
|---|---|---|---|---|---|
| 1 | EDGE NUMBER | VERTEX NUMBER | VERTEX NUMBER | ~ | VERTEX NUMBER |
| ⑤ | | | | | |
| 100 | | | | | |

DEFINITION OF SEQUENCE EDGE

|  | 1 | 2 | 3 | 4 |
|---|---|---|---|---|
| 1 | VERTEX NUMBER | X-COORDINATE | Y-COORDINATE | Z-COORDINATE |
| ∫ |  |  |  |  |
| 10000 |  |  |  |  |

DEFINITION OF SEQUENCE VERTEX

SELECTION OF REFERENCE SURFACE

DELETION OF CURVE

FIG. 9

| 1 | 2 | 3 | 4 | 5 | 6 | 7 | 8 | 9 | 10 |
|---|---|---|---|---|---|---|---|---|---|
| CURVE NUMBER | EDGE NUMBER | DISTANCE WITH RESPECT TO REFERENCE SURFACE | X-COORDINATE OF VERTEX | Y-COORDINATE OF VERTEX | Z-COORDINATE OF VERTEX | X-COORDINATE OF VERTEX | Y-COORDINATE OF VERTEX | Z-COORDINATE OF VERTEX | GROUPING FLAG |
| 1 | | | | | | | | | |
| ⋮ | | | | | | | | | |
| 10000 | | | | | | | | | |

DEFINITION OF SEQUENCE CURVEA

FIG. 10

| | 1 | 2 | ~ | 100 |
|---|---|---|---|---|
| | DISTANCE IN THICKNESS DIRECTION | DISTANCE IN THICKNESS DIRECTION | ~ | DISTANCE IN THICKNESS DIRECTION |
| 1 | | | | |

DEFINITION OF SEQUENCE DIST

DELETION OF CURVE

FIG. 12

| | 1 | 2 | 3 | 4 | 5 | 6 | ~ | 998 | 999 | 1000 |
|---|---|---|---|---|---|---|---|---|---|---|
| | CURVE GROUP NUMBER | CURVE NUMBER | REFERENCE SURFACE DISTANCE | CURVE NUMBER | REFERENCE SURFACE DISTANCE | DISTANCE BETWEEN CURVES | ~ | CURVE NUMBER | REFERENCE SURFACE DISTANCE | DISTANCE BETWEEN CURVES |
| 1 | | | | | | | | | | |
| ~ | | | | | | | | | | |
| 10000 | | | | | | | | | | |

DEFINITION OF SEQUENCE CURVEB

DIVISION OF REFERENCE SURFACE

FIG. 14

| 1 | 2 | 3 | 4 | 5 | 6 | 7 | 8 | 9 |
|---|---|---|---|---|---|---|---|---|
| CURVE GROUP NUMBER | CURVE NUMBER BEFORE DIVISION | CURVE NUMBER | X-COORDINATE OF VERTEX | Y-COORDINATE OF VERTEX | Z-COORDINATE OF VERTEX | X-COORDINATE OF VERTEX | Y-COORDINATE OF VERTEX | Z-COORDINATE OF VERTEX |
| | | | | | | | | |
| | | | | | | | | |

DEFINITION OF SEQUENCE CURVEC

GENERATION OF 2D MESH

FIG. 16

| | 1 | 2 | 3 | 4 | | 1000 |
|---|---|---|---|---|---|---|
| 1 | CURVE NUMBER | NODE NUMBER | NODE NUMBER | NODE NUMBER | ~ | NODE NUMBER |
| ⌇ | | | | | | |
| 10000 | | | | | | |

DEFINITION OF SEQUENCE MESH2DC

FIG. 17

| | 1 | 2 | 3 | 4 |
|---|---|---|---|---|
| 1 | NODE NUMBER | X-COORDINATE | Y-COORDINATE | Z-COORDINATE |
| ⌇ | | | | |
| 10000 | | | | |

DEFINITION OF SEQUENCE NODE

FIG.18

| | 1 | 2 | 3 | 4 | 5 |
|---|---|---|---|---|---|
| 1 | ELEMENT NUMBER | NODE NUMBER | NODE NUMBER | NODE NUMBER | NODE NUMBER |
| ∫ | | | | | |
| 10000 | | | | | |

DEFINITION OF SEQUENCE ELEM2D

FIG. 20

| | 1 | 2 | 3 | ~ | 9 |
|---|---|---|---|---|---|
| 1 | ELEMENT NUMBER | NODE NUMBER | NODE NUMBER | ~ | NODE NUMBER |
| ∫ | | | | | |
| 10000 | | | | | |

DEFINITION OF SEQUENCE ELEM3D

NUMERICAL ANALYSIS MESH GENERATION APPARATUS, NUMERICAL ANALYSIS MESH GENERATION METHOD, AND NUMERICAL ANALYSIS GENERATION PROGRAM

BACKGROUND OF THE INVENTION

1. Field of the Invention

The present invention relates to a numerical analysis mesh generation apparatus, a numerical analysis mesh generation method, and a numerical analysis mesh generation program that generate a mesh for performing numerical analysis for a target geometric model.

2. Description of the Related Art

When numerical analysis is performed for a geometric model, an analysis mesh is generated for the geometric model. The mesh generation process has manually been carried out according to the following procedure in general. Firstly, a surface to be used as a reference is selected based on geometric data of the geometric model to be analyzed. Secondly, the reference surface is divided into a plurality of segments and, on the divided reference surface, a 2D mesh is generated. Finally, the generated 2D mesh is extruded in a predetermined direction to thereby generate a 3D mesh (refer to, for example, Patent Document 1: Jpn. Pat. Appln. Laid-Open Publication No. 2001-155187 and Patent Document 2: Jpn. Pat. Appln. Laid-Open Publication No. 11-144093).

The division or the like of the reference surface is manually carried out in the prior art, complicating the work and taking a lot of time to complete it. In particular, when mistakes are made in the division of the reference surface, it requires an immense amount of time to correct the mistakes. Further, a mesh having a size less than the minimum mesh size is not generated on the reference surface in the prior art, involving an additional work of deleting meshes in the area where the size of the mesh interval is smaller than a specified value (minimum mesh size), moving nodes of the meshes, and the like.

SUMMARY OF THE INVENTION

The present invention has been made to solve the above problems and an object thereof is to provide a technique capable of contributing to a reduction in operational burden on workers and an increase in operating accuracy in a generation process of a mesh for numerical analysis for the geometric model.

To solve the above problems, according to a first aspect of the present invention, there is provided a numerical analysis mesh generation apparatus that generates a mesh for use in performing numerical analysis for a geometric model to be analyzed, comprising: a reference surface selection section that selects one surface from a plurality of surfaces constituting the geometric model as a reference surface for mesh generation; an edge projection section that projects, in a predetermined direction, edges of the geometric model located in a predetermined direction away from the reference surface selected by the reference surface selection section on the reference surface; an interval determination section that determines an interval between edges projected on the reference surface by the edge projection section; a grouping section that groups two or more edges with one of the two or more edges set as a representative edge when the interval determination section determines that the interval between them is smaller than a predetermined interval; and a mesh generation section that generates a mesh for the reference surface based on a surface divided using the edges grouped by the grouping section.

In the numerical analysis mesh generation apparatus, the grouping section groups two or more edges with the longest edge of the two or more edges set as a representative edge when the interval determination section determines that the interval between them is smaller than a predetermined interval.

In the numerical analysis mesh generation apparatus, the reference surface selection section selects, as a reference surface, a surface having the largest area from a plurality of surfaces that constitute the geometric model.

The numerical analysis mesh generation apparatus comprises a node shifting section that shifts nodes related to the representative edge of two or more edges grouped by the grouping section on the edge corresponding to the geometric data specified by information related to vertexes of any other edge than the representative edge, distance with respect to the reference surface, and distance between curves.

The numerical analysis mesh generation apparatus comprises: a distance information acquisition section that acquires information related to distances of respective edges projected on the reference surface by the edge projection section, the distances being measured from the reference surface of the geometric model in a predetermined direction; and an extrusion section that extrudes, in a predetermined direction, the edges projected on the reference surface by the edge projection section based on the distance information acquired by the distance information acquisition section. The interval determination section determines the interval in the predetermined direction between edges extruded in the predetermined direction by the extrusion section. The grouping section groups two or more edges with one of the two or more edges set as a representative edge when the interval determination section determines that the interval between them is smaller than a predetermined interval. The mesh generation section generates a mesh for surfaces of the geometric model extending in the predetermined direction based on the surface divided by the edges grouped by the grouping section.

According to a second aspect of the present invention, there is provided a numerical analysis mesh generation method that generates a mesh for use in performing numerical analysis for a geometric model to be analyzed, comprising: a reference surface selection step that selects one surface from a plurality of surfaces constituting the geometric model as a reference surface; an edge projection step that projects, in a predetermined direction, edges of the geometric model located in a predetermined direction away from the reference surface selected by the reference surface selection step on the reference surface; an interval determination step that determines an interval between edges projected on the reference surface by the edge projection step; a grouping step that groups two or more edges with one of the two or more edges set as a representative edge when the interval determination step determines that the interval between them is smaller than a predetermined interval; and a mesh generation step that generates a mesh for the reference surface based on a surface divided using the edges grouped by the grouping step.

In the numerical analysis mesh generation method, the grouping step groups two or more edges with the longest edge of the two or more edges set as a representative edge when the interval determination step determines that the interval between them is smaller than a predetermined interval.

In the numerical analysis mesh generation method, the reference surface selection step selects, as a reference surface, a surface having the largest area from a plurality of surfaces that constitute the geometric model.

The numerical analysis mesh generation method comprises a node shifting step that shifts nodes related to the representative edge of two or more edges grouped by the grouping step on the edge corresponding to the geometric data specified by information related to vertexes of any other edge than the representative edge, distance with respect to the reference surface, and distance between curves.

The numerical analysis mesh generation method comprises: a distance information acquisition step that acquires information related to distances of respective edges projected on the reference surface by the edge projection step, the distances being measured from the reference surface of the geometric model in a predetermined direction; and an extrusion step that extrudes, in a predetermined direction, the edges projected on the reference surface by the edge projection step based on the distance information acquired by the distance information acquisition step. The interval determination step determines the interval in the predetermined direction between edges extruded in the predetermined direction by the extrusion step. The grouping step groups two or more edges with one of the two or more edges set as a representative edge when the interval determination step determines that the interval between them is smaller than a predetermined interval. The mesh generation step generates a mesh for surfaces of the geometric model extending in the predetermined direction based on the surface divided by the edges grouped by the grouping step.

According to a third aspect of the present invention, there is provided a numerical analysis mesh generation program allowing a computer to execute processing of generating a mesh for use in performing numerical analysis for a geometric model to be analyzed, the program allowing the computer to execute: a reference surface selection step that selects one surface from a plurality of surfaces constituting the geometric model as a reference surface for mesh generation; an edge projection step that projects, in a predetermined direction, edges of the geometric model located in a predetermined direction away from the reference surface selected by the reference surface selection step on the reference surface; an interval determination step that determines an interval between edges projected on the reference surface by the edge projection step; a grouping step that groups two or more edges with one of the two or more edges set as a representative edge when the interval determination step determines that the interval between them is smaller than a predetermined interval; and a mesh generation step that generates a mesh for the reference surface based on a surface divided using the edges grouped by the grouping step.

As described above, according to the present invention, it is possible to provide a technique capable of contributing to a reduction in operational burden on workers and an increase in operating accuracy in a generation process of a mesh for numerical analysis for the geometric model.

BRIEF DESCRIPTION OF THE DRAWINGS

FIG. 4 is a view for explaining a sequence SURF;

FIG. 5 is a view for explaining a sequence EDGE;

FIG. 9 is a view for explaining a sequence CURVEA;

FIG. 10 is a view for explaining a sequence DIST;

FIG. 12 is a view for explaining a sequence CURVEB;

FIG. 14 is a view for explaining a sequence CURVEC;

FIG. 16 is a view for explaining a sequence MESH2DC;

FIG. 17 is a view for explaining a sequence NODE;

FIG. 18 is a view for explaining a sequence ELEM2D;

FIG. 20 is a view for explaining a sequence ELEM3D.

DETAILED DESCRIPTION OF THE PREFERRED EMBODIMENTS

An embodiment of the present invention will be described below with reference to the accompanying drawings.

Figure 1:
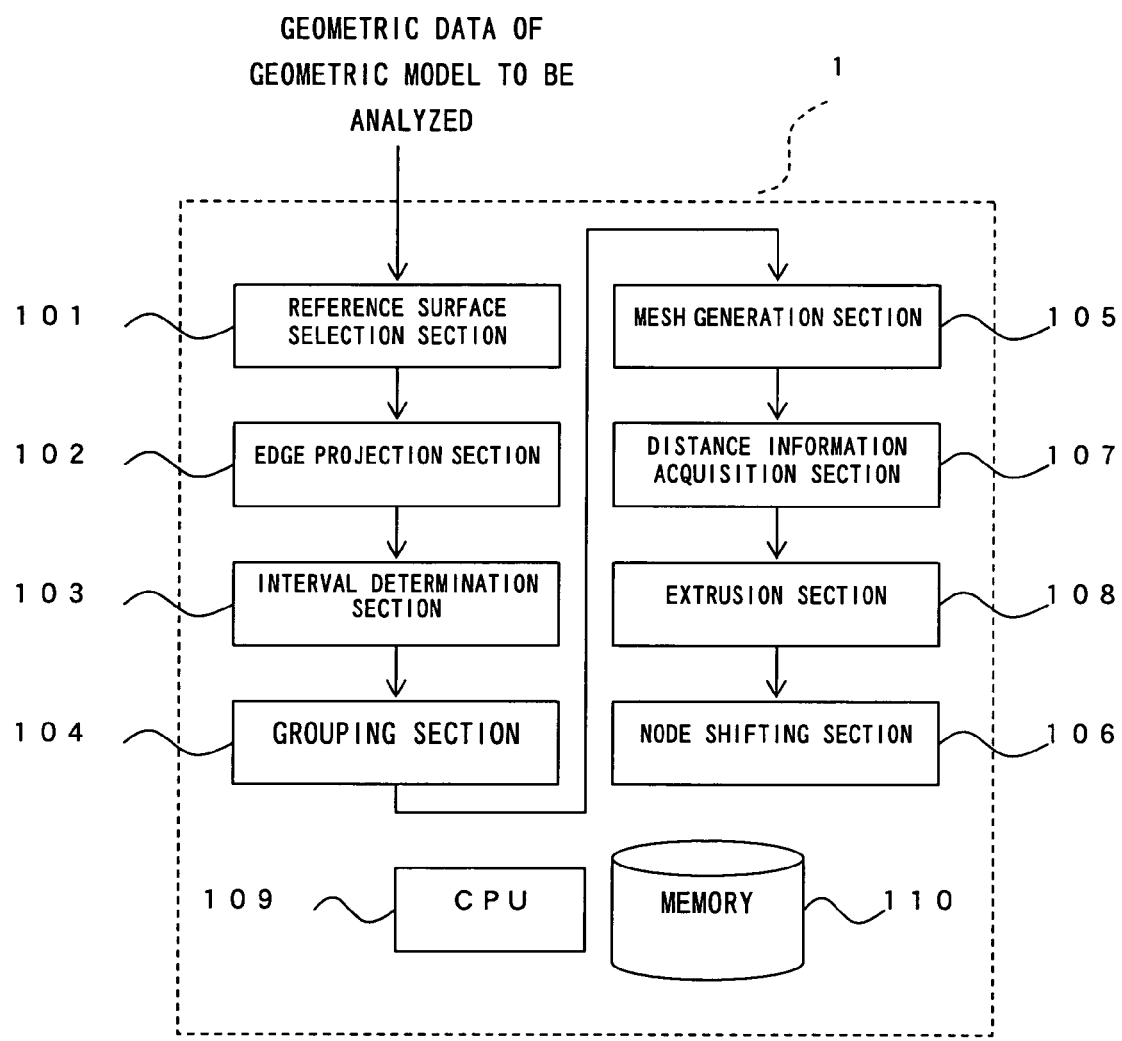
FIG. 1 is a functional block diagram for explaining a numerical analysis mesh generation apparatus according to an embodiment of the present invention.

FIG. 1 is a functional block diagram for explaining a numerical analysis mesh generation apparatus according to an embodiment of the present invention. A numerical analysis mesh generation apparatus 1 according to the present embodiment has a function of generating a mesh for use in performing numerical analysis for a geometric model to be analyzed.

The numerical analysis mesh generation apparatus 1 includes a reference surface selection section 101, an edge projection section 102, an interval determination section 103, a grouping section 104, a mesh generation section 105, a node shifting section 106, a distance information acquisition section 107, an extrusion section 108, a CPU 109, and a MEMORY 110.

The reference surface selection section 101 has a function of acquiring geometric data of a geometric model to be analyzed and selecting one surface from a plurality of surfaces constituting the geometric model as a reference surface for mesh generation.

The edge projection section 102 has a function of projecting, in a predetermined direction, edges of the geometric model located in a predetermined direction away from the reference surface selected by the reference surface selection section 101 on the reference surface.

The interval determination section 103 has a function of determining an interval between edges projected on the reference surface by the edge projection section 102.

The grouping section 104 has a function of grouping two or more edges with one of the two or more edges set as a representative edge when the interval determination section 103 determines that the interval between them is smaller than a predetermined interval.

The mesh generation section 105 has a function of generating a mesh for numerical analysis for the reference surface based on a surface divided using the edges grouped by the grouping section 104.

The node shifting section 106 has a function of shifting nodes related to the representative edge of two or more edges grouped by the grouping section 104 on the edge corresponding to the geometric data specified by information related to vertexes of any other edge than the representative edge, distance with respect to the reference surface, and distance between curves (edges). More specifically, in the case where there exists no edge in the area of [reference surface distance (distances between the edges in the same group projected on the reference surface) ±minimum mesh size] in a grouped edge, the node shifting section 106 shifts all nodes on the dividing line obtained by extending the representative edge to appropriate positions according to the geometric data (edge).

The distance information acquisition section 107 has a function of acquiring information related to distances of respective edges projected on the reference surface by the edge projection section 102, the distances being measured from the reference surface of the geometric model in a predetermined direction.

The extrusion section 108 has a function of extruding, in a predetermined direction, the mesh generated on the surface divided by the edges projected on the reference surface by the edge projection section 102 based on the distance information acquired by the distance information acquisition section 107.

The CPU 109 has a function of executing various processing in the numerical analysis mesh generation apparatus as well as executing programs stored in the MEMORY 110 to realize various functions. The MEMORY 110 is a ROM, a RAM, or the like and has a function of storing various information or programs utilized in the numerical analysis mesh generation apparatus.

Figure 2:
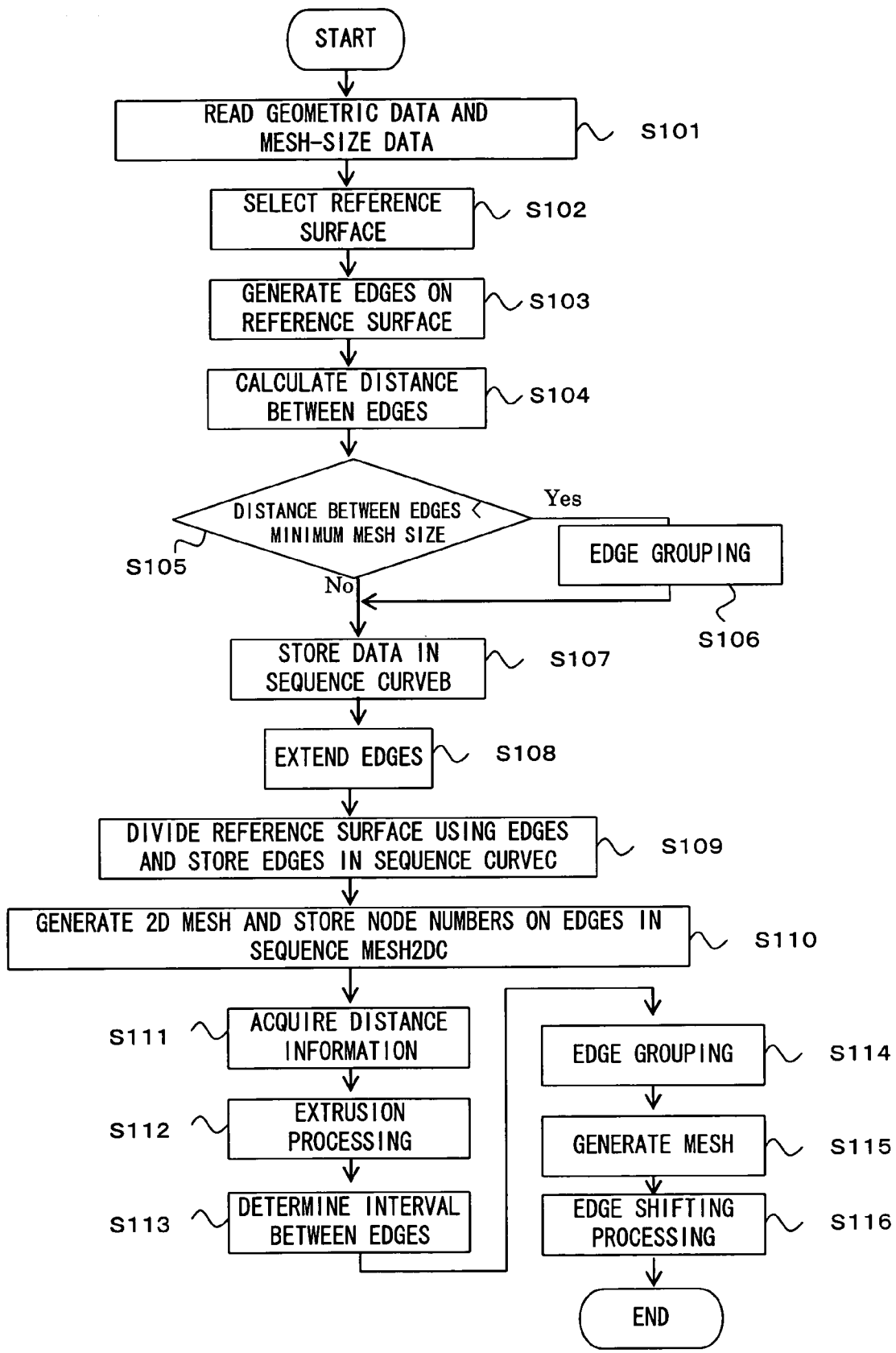
FIG. 2 is a flowchart for explaining the flow of a process (numerical analysis mesh generation method) performed in the numerical analysis mesh generation apparatus according to the present embodiment.

FIG. 2 is a flowchart for explaining the flow of a process (numerical analysis mesh generation method) performed in the numerical analysis mesh generation apparatus according to the present embodiment. The numerical analysis mesh generation method according to the present embodiment generates a mesh for use in performing numerical analysis for a target geometric model.

Figure 3:
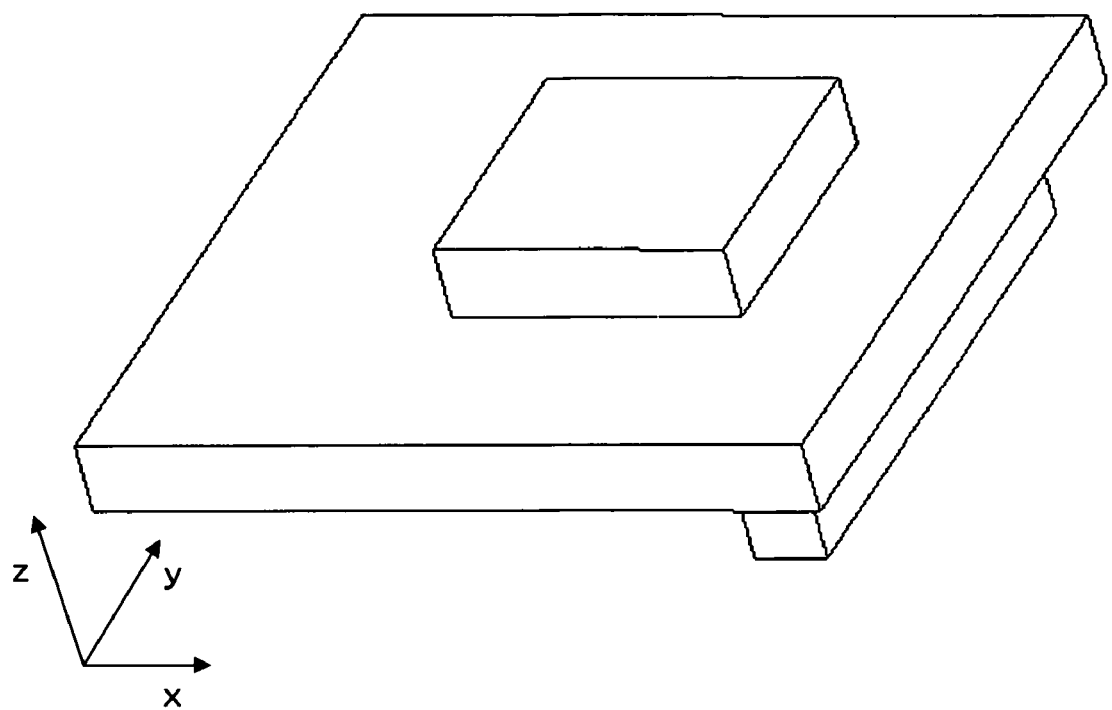
FIG. 3 is a view showing an example of geometric data of a geometric model to be analyzed (which is a target of mesh creation)

The numerical analysis mesh generation apparatus 1 reads geometric data and mesh-size data of a geometric model (see FIG. 3) to be analyzed (which is a target of mesh creation) (S101). The geometric data to be read at this time includes a sequence SURF (see FIG. 4) that stores surface information of a geometric model to be analyzed, a sequence EDGE (see FIG. 5) that stores edge information of a geometric model to be analyzed, and a sequence VERTEX (see FIG. 6) that stores information related to vertexes of a geometric model to be analyzed.

Figures 6, 7:
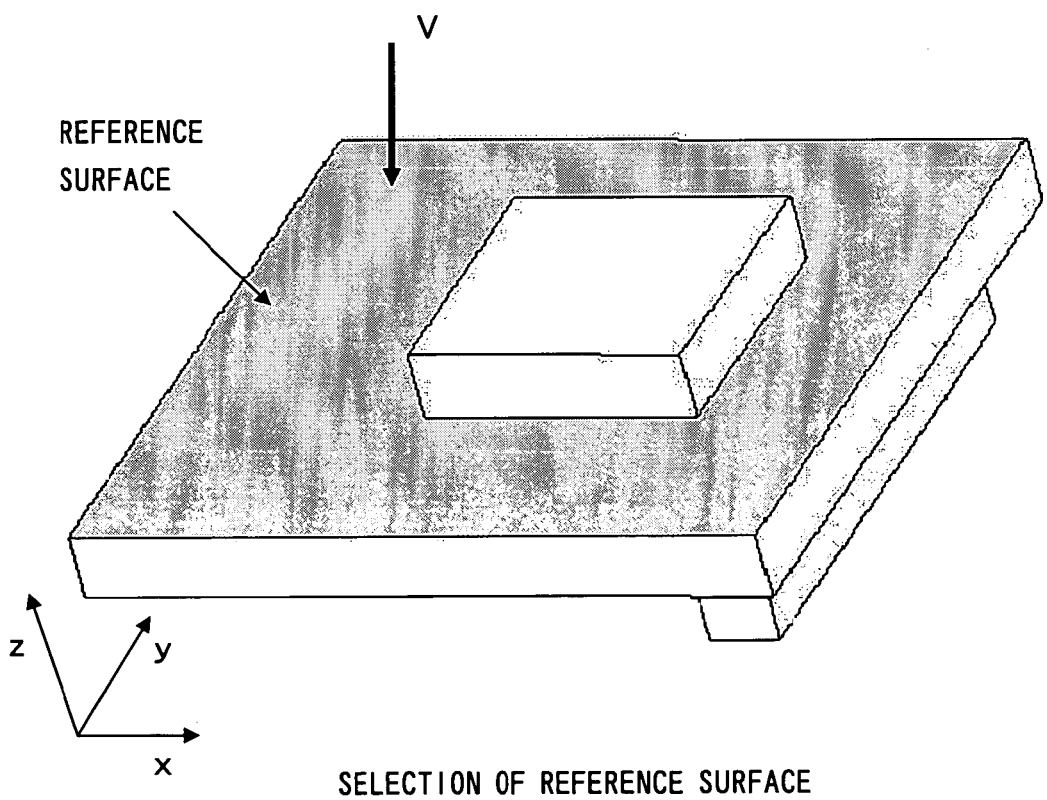
FIG. 6 is a view for explaining a sequence VERTEX.
FIG. 7 is a view for explaining selection of a reference surface.

Subsequently, the reference surface selection section 101 selects one surface from a plurality of surfaces constituting the geometric model as a reference surface for mesh generation (reference surface selection step) (S102) (see FIG. 7). In the present embodiment, the reference surface selection section 101 selects, as a reference surface, a surface having the largest area of a plurality of surfaces constituting the geometric model in order to reduce load on computation processing performed at the mesh generation time. The data of the reference surface selected as described above is stored in the MEMORY 110.

Figure 8:
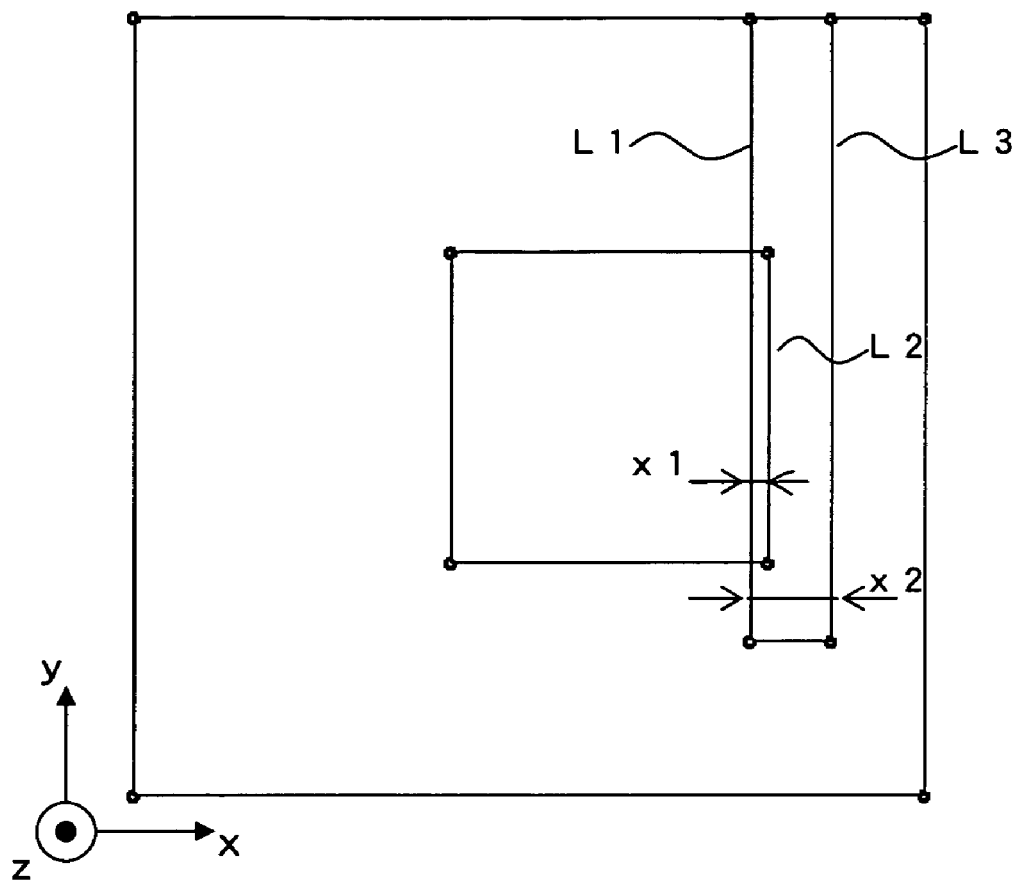
FIG. 8 is a view showing edges projected on the reference surface set for the geometric model as viewed from V-direction of FIG. 7.

Subsequently, the edge projection section 102 extracts edges from the geometric data of the geometric model which is a target of mesh creation and projects, in a predetermined direction (Z-axis direction), edges of the geometric model located in a predetermined direction (in this case, Z-axis direction) away from the reference surface selected by the reference surface selection step on the reference surface (edge projection step) (S103). FIG. 8 is a view showing edges projected on the reference surface set for the geometric model as viewed from V-direction of FIG. 7. The edges projected on the reference surface are treated as curves, and information related to the edges is stored, as a sequence CURVEA (see FIG. 9), in the MEMORY 110. Further, distance data (reference surface distance) representing a distance between respective edges projected on the reference surface and reference surface in the Z-axis direction is stored, as a sequence DIST (see FIG. 10) in the MEMORY 110.

The interval determination section 103 determines an interval between edges projected on the reference surface by the edge projection step (interval determination step) (S104). In the example shown in FIG. 8, the interval in the X-axis direction between edges L1 and L2 projected on the reference surface is "x1", and interval in the X-direction between edges L1 and L3 is "x2".

Figure 11:
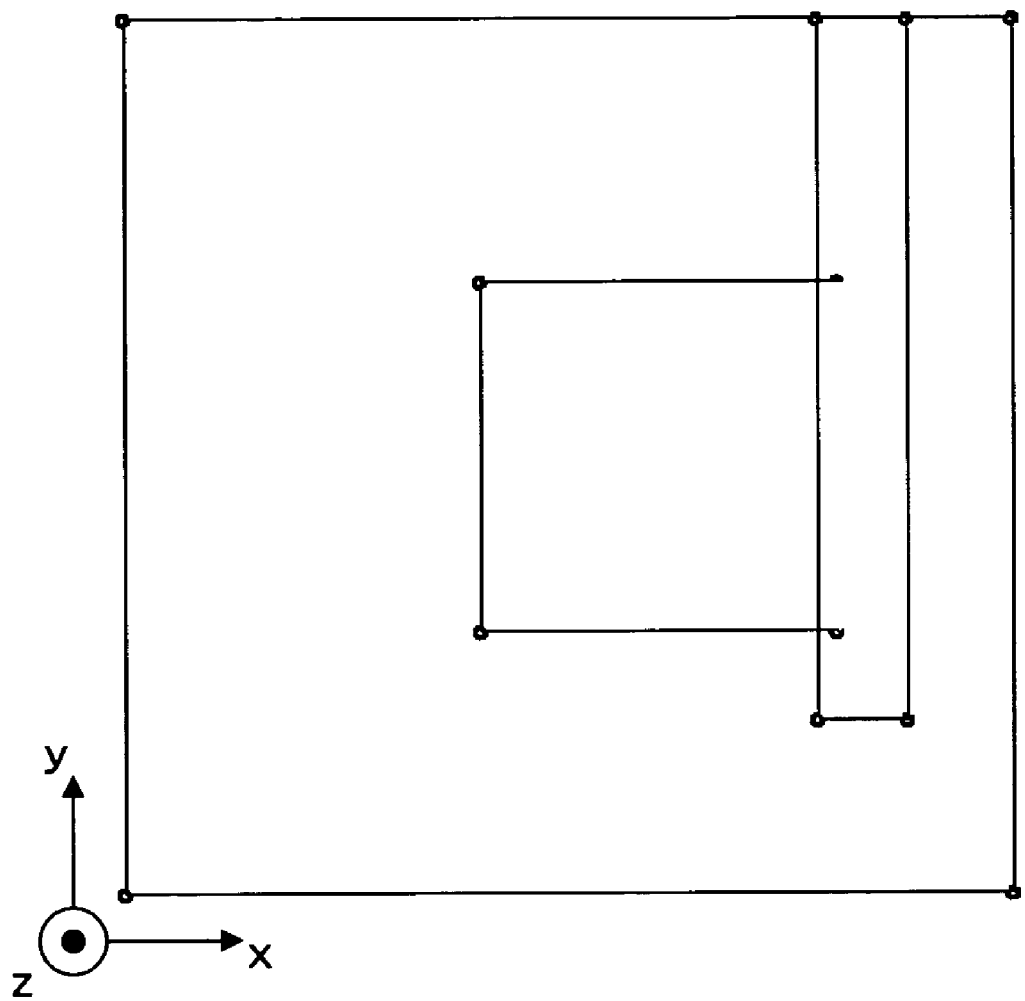
FIG. 11 is a view for explaining deletion of the edge.

The grouping section 104 groups two or more edges with one of the two or more edges set as a representative edge when it is determined in the interval determination step that the interval between the two or more edges is smaller than the minimum mesh size (a predetermined interval) (grouping step) (S105, S106). When a relation among the interval x1, interval x2, and minimum mesh size xm satisfies x1<xm<x2, the grouping section 104 groups two or more edges (in this case, L1 and L2) the interval between which is determined to be smaller than a predetermined interval by the interval determination step, with the longest edge (in this case, L1) of the edges set as a representative edge. The grouping processing of setting the longest edge as a representative edge and deleting other edges (in this case, L2) than the representative edge (see FIG. 11) contributes to a reduction of load on computation processing for later-described node shifting. The edges obtained by the above grouping processing serve as dividing lines for dividing the reference surface. The data related to the representative edge and data related to the deleted edge (edge number and distance between the deleted edge and reference surface) are combined together as one group and stored, as a sequence CURVEB, in the MEMORY 110 (S 107) (see FIG. 12).

Figure 13:
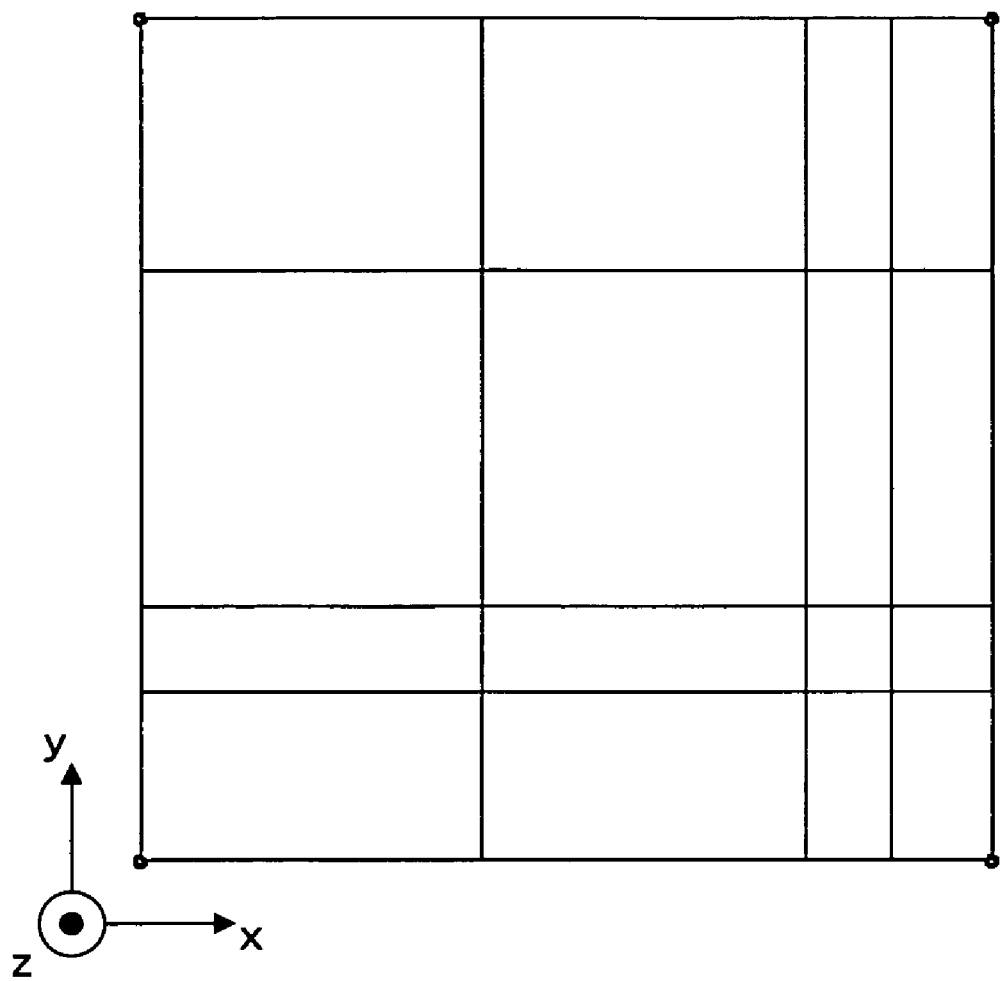
FIG. 13 is a view for explaining division of the reference surface.

Subsequently, the edges that have not been deleted by the above grouping step are extended on the reference surfaces (S108) to divide the reference surface into a planarity of segments (FIG. 13). The edges dividing the reference surface are stored, as a sequence CURVEC, in the MEMORY 110 (S109) (see FIG. 14).

Figure 15:
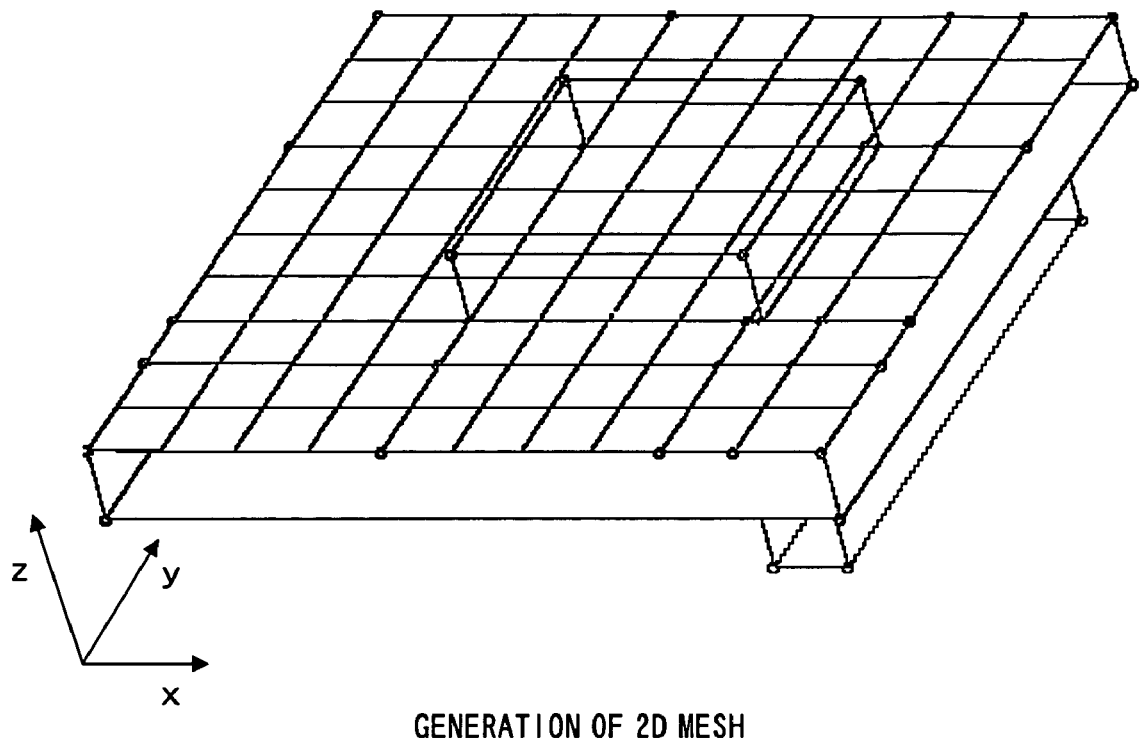
FIG. 15 is a view for explaining generation of a 2D mesh.

The mesh generation section 105 generates a 2D mesh having a specified size for the reference surface that has been divided using the grouped edges by the grouping steps as described above (mesh generation step) (see FIG. 15). "Curve numbers" of curves (corresponding to edges) that constitute the mesh generated as described above and "nodes on the edges" in the 2D mesh are associated with each other and stored, as a sequence MESH2DC, in the MEMORY 110 (S110) (see FIG. 16). Information related to nodes in the 2D mesh that has been generated as described above is stored as a sequence NODE (see FIG. 17), in the MEMORY 110. Further, 2D element information related to the 2D mesh is stored, as a sequence ELEM2D, in the Memory 110 (see FIG. 18).

The distance information acquisition section 107 acquires, from reference surface distance data (node creation position in the Z-axis direction), information related to distances of respective edges projected on the reference surface by the edge projection step, the distances being measured from the reference surface of the geometric model in the Z-axis direction (predetermined direction) (distance information acquisition step) (S111).

The extrusion section 108 extrudes, in the Z-axis direction (predetermined direction), the mesh generated on the surface divided by the edges projected on the reference surface by the edge projection step based on the reference surface distance information acquired by the distance information acquisition step (extrusion step) (S112).

The interval determination section 103 determines an interval in the Z-axis direction between edges extruded in the Z-axis direction (predetermined direction) by the extrusion step (interval determination step) (S113).

The grouping section 104 groups two or more edges with one of the two or more edges set as a representative edge when the interval determination step (S113) determines that the interval between them is smaller than a predetermined interval (grouping step) (S114).

The mesh generation section 105 associates the 2D mesh that has already been generated on the reference surface and edge information based on the edges grouped by the grouping step (S114) and generates a mesh for surfaces of the geometric model extending in the Z-axis direction based on the node creation position in the Z-axis direction, distance with respect to the reference surface, vertex coordinates of edges, information related to distance between edges (mesh generation step) (S115).

Figure 19:
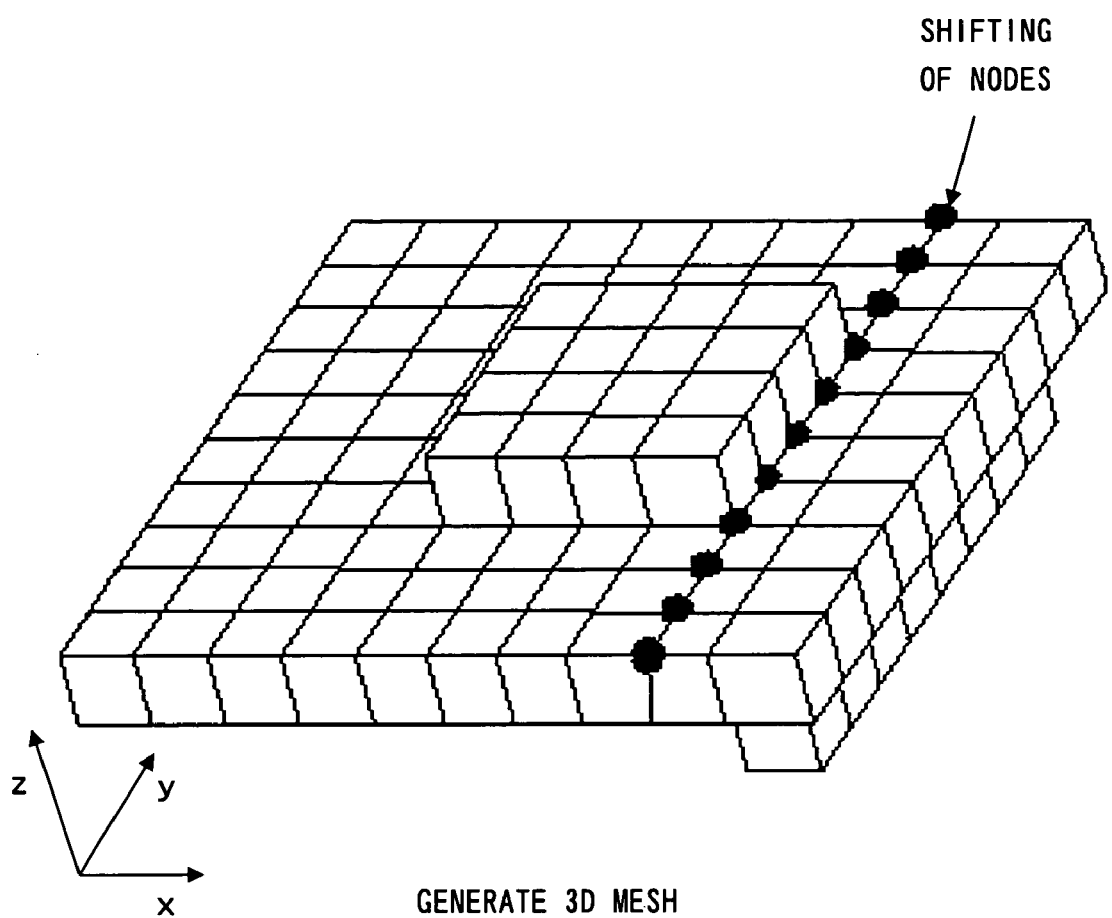
FIG. 19 is a view for explaining shifting of edges.

The node shifting section 106 shifts nodes related to the representative edge of two or more edges grouped by the grouping step on the edge corresponding to the geometric data specified by information related to vertexes of any other edge than the representative edge, distance with respect to the reference surface, and distance between curves (node shifting step) (S116) (see FIG. 19). More specifically, in the case where there exists no edge in the area of [reference surface distance (distances between the edges in the same group projected on the reference surface) ±minimum mesh size] in a grouped edge, the node shifting section 106 shifts all nodes on the dividing line obtained by extending the representative edge according to the geometric data (edge). The representative edge can be shifted to the position of any other edge than the representative edge of the grouped two or more edges as described above, so that it is possible to shift a part of the dividing lines that constitute the mesh to an appropriate position according to the shape of the geometric model. 3D element information related to the 3D mesh generated as described above is stored, as a sequence ELEM3D, in the MEMORY 110 (see FIG. 20).

When the CPU 109 executes a numerical analysis mesh generation program stored in the MEMORY 110, the above-mentioned respective steps performed in the numerical analysis mesh generation apparatus 1 can be realized.

By storing the above numerical analysis mesh generation program in a computer-readable storage medium, it is possible to allow the computer constituting a communication terminal and communication control apparatus to execute the program. The computer-readable storage medium mentioned here includes: a portable storage medium such as a CD-ROM, a flexible disk, a DVD disk, a magneto-optical disk, or a semiconductor storage device such as an IC card; a fixed storage device mounted in a computer, such as ROM, RAM, or magnetic recording device; a database that holds computer program; and another computer and database thereof.

As described above, the numerical analysis mesh generation apparatus is capable of automatically performing selection of a reference surface and division of the selected reference surface for a geometric model to be analyzed. Further, edges the interval between which is smaller than the minimum mesh size are grouped so as not to generate a dividing size smaller than the minimum mesh size. At this time, information related to a distance between edges (curves) and a distance with respect to the reference surface are included in the edge group and, based on the information, nodes are automatically shifted to appropriate positions in the mesh generation process. With this configuration, elements smaller than the minimum mesh size are not generated.

As described above, according to the embodiment of the present invention, it is possible to easily create a mesh having an appropriate size for an object to be analyzed having a complicated shape while reducing occurrence of artificial mistakes. Further, it is possible to reduce complicated operations, thereby realizing a significant reduction of man-hour requirement for mesh generation.

It takes 6 to 8 hours to create a mesh for a holder which is one of components of a mobile phone. The above time can be reduced to about 1 to 2 hours by the numerical analysis mesh generation apparatus according to the embodiment of the present invention. Further, when analysis is performed using a hexahedron or pentahedron mesh, it is possible to reduce analysis computation time to 70% of the case where a tetrahedron mesh is used. Further, it is possible to change with ease.

Although the present invention has been described in detail based on a specific embodiment, it will be apparent to those having ordinary skill in the art that a number of changes, modifications, or alternations to the invention as described herein may be made without departing from the spirit and scope of the present invention.

What is claimed is:

1. A numerical analysis mesh generation apparatus comprising:
    a memory that stores a geometric model;
    a reference surface selection section that selects one surface from a plurality of surfaces constituting the geometric model stored in the memory as a reference surface for mesh generation automatically;
    an edge projection section that projects, in a predetermined direction, edges of the geometric model on the reference surface so as to generate edge lines on the reference surface automatically, the edges located away from the reference surface;
    an interval determination section that determines an interval between the edge lines on the reference surface automatically;
    a grouping section that groups two or more edge lines with one of the two or more edge lines set as a representative edge line automatically when the interval determination section determines that the interval between the edge lines is smaller than a predetermined minimum mesh size;
    a mesh generation section that generates a mesh having a specified size on the reference surface based on the edge lines grouped by the grouping section automatically;
    an extrusion section that extrudes a part of the representative edge line along the predetermined direction based on distance information indicating a distance between the reference surface and a target edge of the edges which projected on the reference surface automatically; and
    a node shifting section that shift the representative edge line along the reference surface automatically in order to shift the extruded part of the representative edge line to the target edge.

2. The numerical analysis mesh generation apparatus according to claim 1, wherein
    the grouping section groups two or more edge lines with the longest edge line of the two or more edge lines set as a representative edge line when the interval determination section determines that the interval between the edge lines is smaller than the predetermined minimum mesh size.

3. The numerical analysis mesh generation apparatus according to claim 1, wherein
the reference surface selection section selects, as a reference surface, a surface having the largest area from a plurality of surfaces that constitute the geometric model.

4. The numerical analysis mesh generation apparatus according to claim 1, further comprising a node shifting section that shifts nodes related to the representative edge line of two or more edge lines grouped by the grouping section on the edge corresponding to the geometric data specified by information related to vertexes of any other edge line than the representative edge line, distance with respect to the reference surface, and distance between curves.

5. The numerical analysis mesh generation apparatus according to claim 1, further comprising:
a distance information acquisition section that acquires information related to distances of respective edge lines projected on the reference surface by the edge projection section, the distances being measured from the reference surface of the geometric model in a predetermined direction; and
an extrusion section that extrudes, in a predetermined direction, the edge lines projected on the reference surface by the edge projection section based on the distance information acquired by the distance information acquisition section,
the interval determination section determines the interval in the predetermined direction between edge lines extruded in the predetermined direction by the extrusion section,
the grouping section groups two or more edge lines with one of the two or more edge lines set as a representative edge line when the interval determination section determines that the interval between the edge lines is smaller than the predetermined minimum mesh size, and
the mesh generation section generates a mesh for surfaces of the geometric model extending in the predetermined direction based on the surface divided by the edge lines grouped by the grouping section.

6. A numerical analysis mesh generation method applied to a computer including a memory that stores a geometric model comprising:
automatically selecting one surface from a plurality of surfaces constituting the geometric model as a reference surface for mesh generation;
automatically projecting, in a predetermined direction, edges of the geometric model on the reference surface so as to generate edge lines on the reference surface, the edges located away from the reference surface;
automatically determining an interval between edge lines on the reference surface;
automatically grouping two or more edge lines with one of the two or more edge lines set as a representative edge line when the determining determines that the interval between the edge lines is smaller than a predetermined minimum mesh size;
automatically generating a mesh having a specified size on the reference surface based on the edge lines grouped by the grouping;
automatically extruding a part of the representative edge line along the predetermined direction based on distance information indicating a distance between the reference surface and a target edge of the edges which projected on the reference surface; and
automatically shifting the representative edge line along the reference surface in order to shift the extruded part of the representative edge line to the target edge.

7. The numerical analysis mesh generation method according to claim 6, wherein
the grouping groups two or more edge lines with the longest edge line of the two or more edge lines set as a representative edge line when the interval determination determines that the interval between the edge lines is smaller than the predetermined minimum mesh size.

8. The numerical analysis mesh generation method according to claim 6, wherein
the reference surface selection selects, as a reference surface, a surface having the largest area from a plurality of surfaces that constitute the geometric model.

9. The numerical analysis mesh generation method according to claim 6, further comprising shifting, by the computer, nodes related to the representative edge line of two or more edge lines grouped by the grouping on the edge corresponding to the geometric data specified by information related to vertexes of any other edge line than the representative edge line, distance with respect to the reference surface, and distance between curves.

10. The numerical analysis mesh generation method according to claim 6, further comprising:
acquiring, by the computer, information related to distances of respective edge lines projected on the reference surface by the edge projection, the distances being measured from the reference surface of the geometric model in a predetermined direction; and
extruding, by the computer, in a predetermined direction, the edge lines projected on the reference surface by the edge projection based on the distance information acquired by the distance information acquisition, wherein
determining the interval in the predetermined direction between edge lines extruded in the predetermined direction by the extrusion,
grouping two or more edge lines with one of the two or more edge lines set as a representative edge line when the interval determination determines that the interval between the edge lines is smaller than the predetermined minimum mesh size, and
generating a mesh for surfaces of the geometric model extending in the predetermined direction based on the surface divided by the edge lines grouped by the grouping.

11. A non-transitory computer-readable storage medium having recorded thereon a numerical analysis mesh generation program allowing a computer that includes a memory which stores a geometric model to execute a process comprising:
automatically selecting one surface from a plurality of surfaces constituting the geometric model as a reference surface for mesh generation;
automatically projecting, in a predetermined direction, edges of the geometric model on the reference surface so as to generate edge lines on the reference surface, the edges located away from the reference surface;
automatically determining an interval between edge lines on the reference surface;
automatically grouping two or more edge lines with one of the two or more edge lines set as a representative edge line when the determining determines that the interval between the edge lines is smaller than a predetermined minimum mesh size; generating a mesh having a specified size on the reference surface based on the edge lines grouped by the grouping;

automatically extruding a part of the representative edge line along the predetermined direction based on distance information indicating a distance between the reference surface and a target edge of the edges which projected on the reference surface; and automatically shifting the representative edge line along the reference surface in order to shift the extruded part of the representative edge line to the target edge.

12. The computer-readable medium according to claim 11, wherein the grouping groups two or more edge lines with the longest edge line of the two or more edge lines set as a representative edge line when the interval determination determines that the interval between the edge lines is smaller than the predetermined minimum mesh size.

13. The computer-readable medium according to claim 11, wherein the reference surface selection selects, as a reference surface, a surface having the largest area from a plurality of surfaces that constitute the geometric model.

14. The computer-readable medium according to claim 11, wherein the computer shifts nodes related to the representative edge line of two or more edge lines grouped by the grouping on the edge corresponding to the geometric data specified by information related to vertexes of any other edge line than the representative edge, distance with respect to the reference surface, and distance between curves.

15. The computer-readable medium according to claim 11, wherein the program allows the computer to execute:

acquiring information related to distances of respective edge lines projected on the reference surface by the edge projection, the distances being measured from the reference surface of the geometric model in a predetermined direction; and extruding, in a predetermined direction, the edge lines projected on the reference surface by the edge projection based on the distance information acquired by the distance information acquisition, determining the interval in the predetermined direction between edge lines extruded in the predetermined direction by the extrusion, grouping two or more edge lines with one of the two or more edge lines set as a representative edge line when the interval determination determines that the interval between the edge lines is smaller than the predetermined minimum mesh size, and generating a mesh for surfaces of the geometric model extending in the predetermined direction based on the surface divided by the edge lines grouped by the grouping.

* * * * *